United States Patent [19]

Queveau et al.

[11] 4,371,186
[45] Feb. 1, 1983

[54] ARTICULATION FOR VEHICLE, ESPECIALLY AN ARTICULATED BUS

[76] Inventors: Gerard Queveau; Christian Cheron, both of 7, rue Louis Heuliez, 79140 Cerizay, France

[21] Appl. No.: 223,144

[22] Filed: Jan. 7, 1981

[30] Foreign Application Priority Data

Jan. 7, 1980 [FR] France .................................. 80 00215

[51] Int. Cl.³ .............................................. B60D 1/00
[52] U.S. Cl. ................................ 280/432; 180/14 A; 280/403; 280/492
[58] Field of Search ............... 280/492, 493, 494, 400, 280/403, 432, 446 B; 180/14 R, 14 A

[56] References Cited

U.S. PATENT DOCUMENTS

| 2,407,007 | 9/1946 | Henrichsen | 280/403 |
| 2,591,624 | 4/1952 | Siebels | 280/492 |
| 2,843,417 | 7/1958 | Wahl | 280/492 |
| 2,922,481 | 1/1960 | Hutter et al. | 180/14 |
| 3,360,064 | 12/1967 | Budzich et al. | 180/14 |
| 3,374,847 | 3/1968 | Budzich | 180/14 |
| 3,874,699 | 4/1975 | Hayes et al. | 280/432 |
| 3,994,510 | 11/1976 | Howard | 280/432 |

FOREIGN PATENT DOCUMENTS

| 549832 | 12/1959 | Belgium . |
| 1001595 | 1/1957 | Fed. Rep. of Germany . |
| 1066875 | 10/1959 | Fed. Rep. of Germany . |
| 1964708 | 12/1970 | Fed. Rep. of Germany . |
| 685508 | 1/1953 | United Kingdom . |

OTHER PUBLICATIONS

Patent Abstracts of Japan, vol. 1, No. 62, Jun. 17, 1977, p. 779 M 77, Kokia No. 52-11511.

Primary Examiner—Joseph F. Peters, Jr.
Assistant Examiner—Donn McGiehan
Attorney, Agent, or Firm—Leydig, Voit, Osann, Mayer & Holt, Ltd.

[57] ABSTRACT

An articulation for an articulated vehicle is disclosed which comprises first and second elements fixed respectively to each of the vehicle sections and an intermediate element, the three elements each presenting mean main planes which blend into a single horizontal plane to yield an articulation of limited thickness, the first element being articulated on the intermediate element both around a longitudinal horizontal axis and around a transverse horizontal axis, the second element being articulated on the intermediate element around a vertical axis. A preferred embodiment includes friction pads and cooperating surfaces for dampening the articulation around the vertical axis and force transducers for measuring any horizontal compressive force transmitted through the articulation.

21 Claims, 7 Drawing Figures

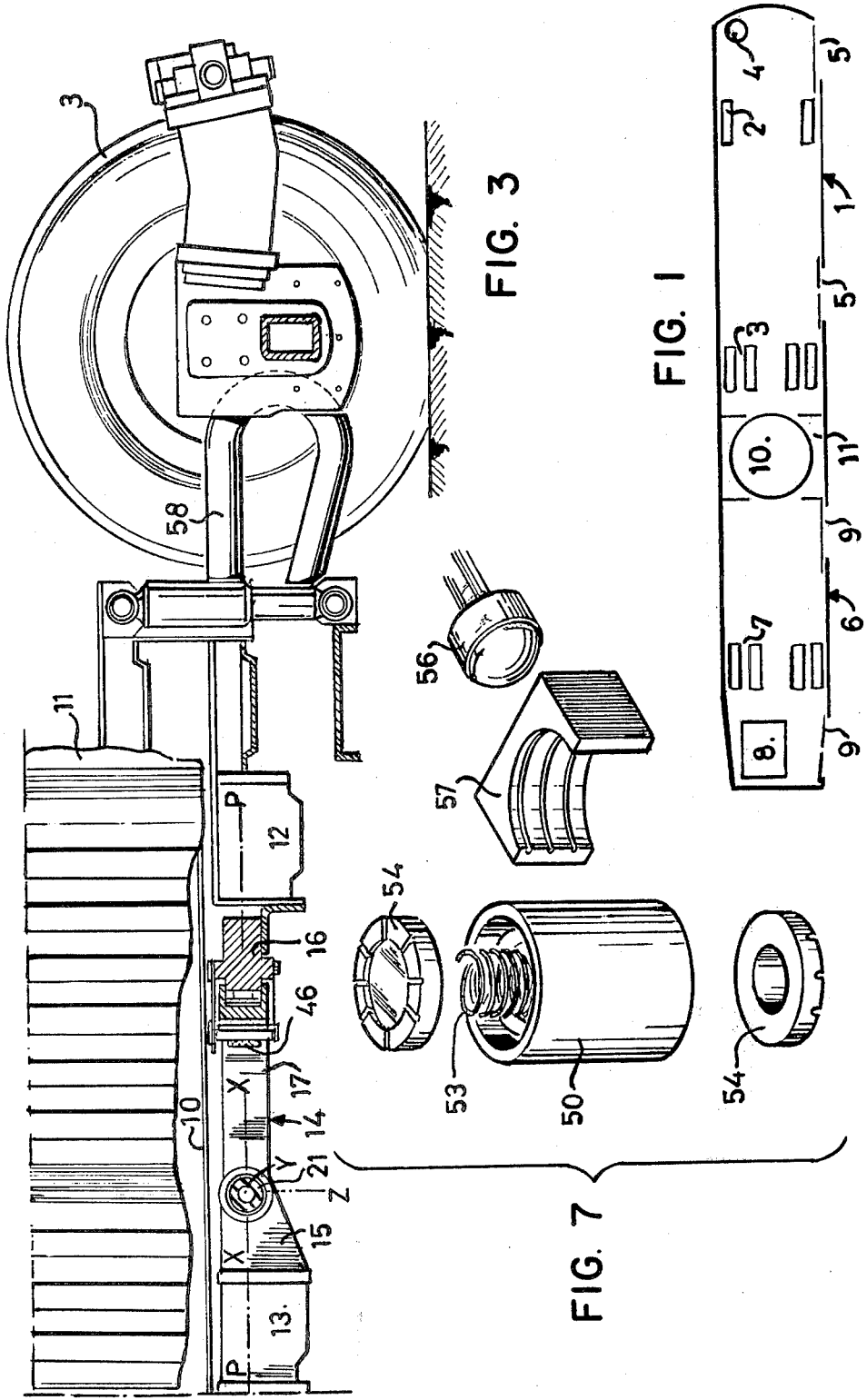

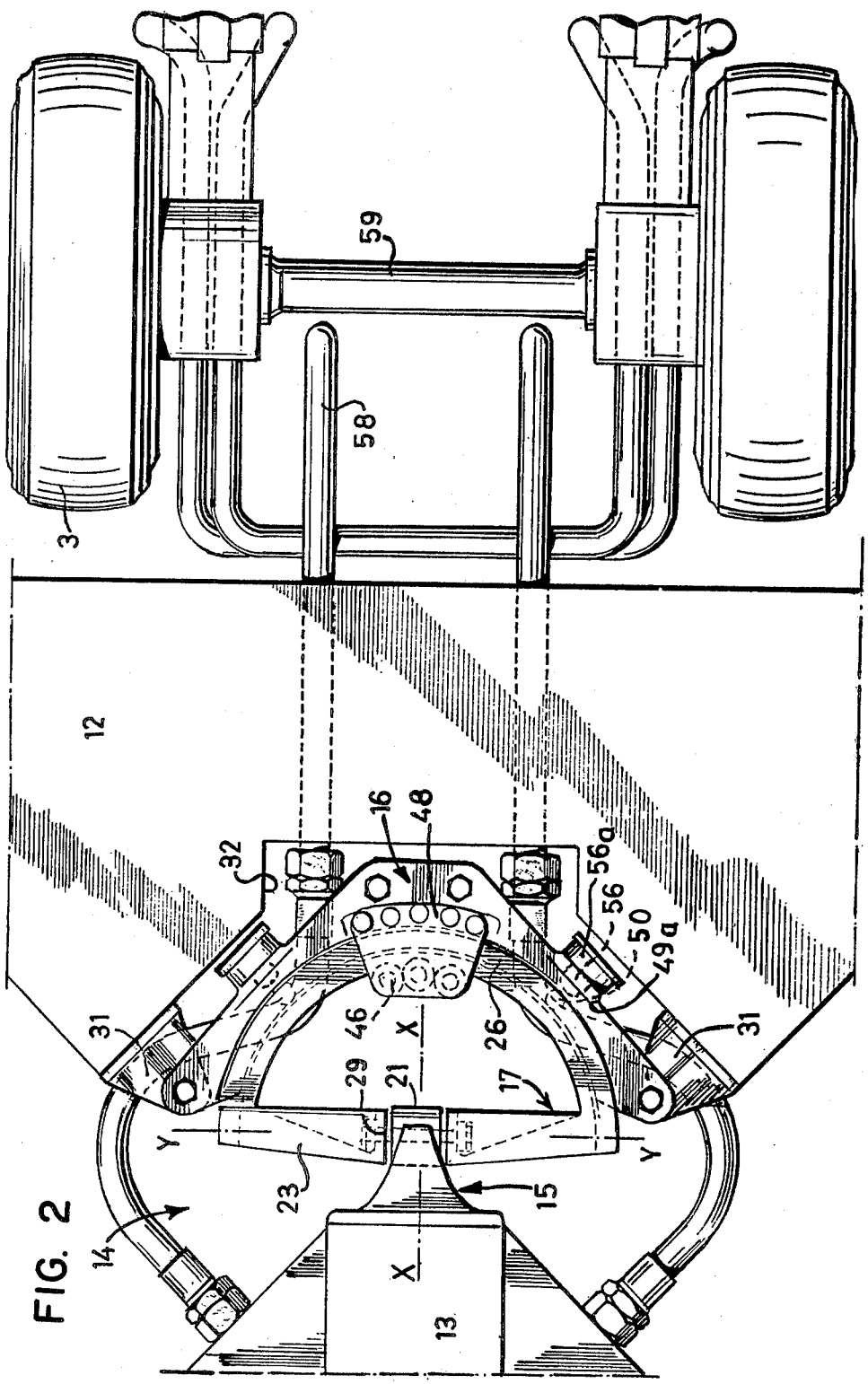

ARTICULATION FOR VEHICLE, ESPECIALLY AN ARTICULATED BUS

The present invention relates to articulations for articulated vehicles, e.g., high volume mass transportation articulated buses having a forward and a rear section connected by the articulation. Typically the forward section has front, steering wheels and rear, non-steering wheels. The rear section typically has a single set of wheels which are either steering or non-steering depending upon whether the wheels are free-wheeling or driven, respectively.

In such a vehicle the articulation, the only rigid connection between the two sections of the vehicle, must serve several functions. Primarily it must transmit the driving and braking forces. In addition, a 90° rotation capability (45° on each side of the longitudinal axis of the vehicle) is generally necessary to satisfy the requirements relative to the turning radius of the vehicle. Furthermore, accommodation of rolling or pitching of the vehicle sections relative to one another is indispensable for a good holding of the road by the vehicle. Finally, dampening of the rotation motions is essential to prevent a zigzag phenomenon which sometimes appears at high speed, generally at a speed above about 70 km/hour, the dampening also contributing to the good holding of the road by the vehicle.

Known articulations typically comprise either a simple ball, or two balls, or a double pivoting ring. The articulation with a simple ball makes it possible to transmit the driving and braking forces and the guiding forces. It is necessary, however, to associate with the ball a damper device placed between the sections of the vehicle which makes it possible to stabilize and/or to limit the movements of the rear and forward sections relative to one another. In the double ball arrangement such a dampening device may be integrated into the articulation to directly transmit the forces between the sections. The third type of articulation comprises two pivoting rings placed on top of each other and respectively affixed to the chassis of the two sections of the vehicle, and between which there is inserted an articulated bearing, the latter making possible the rolling motions while the rings transmit the pulling and/or pushing forces, and the guiding forces. A stabilizing device is typically further associated with the articulation and placed between the sections. Examples of such arrangements are disclosed in Belgian Pat. No. 552,998 and French Pat. No. 1,120,094.

One of the desired improvements in articulated vehicles, especially public transportation vehicles, is a reduction of the floor height while maintaining adequate clearance between the undercarriage and the ground. The thickness of the articulation connection itself is often the limiting factor in simultaneously meeting these two competing objectives since, in most cases, in order to preserve an easy access between the two sections of the vehicle, the floor levels of the forward and rear sections are matched to the level of the platform over the articulation. Because of the complexity and, therefore, the bulk, vertically at least, of the known articulations, however, it has not been possible to appreciably reduce the level of the platform over the articulation. As a result, in order to maintain adequate ground clearance while in motion and also facilitate boarding and exiting, in the past it has often been necessary to actually raise and lower the floors and the platform, as with a pneumatic suspension system. Such an arrangement has obvious disadvantages, a significant one being the cost.

Accordingly, the primary object of the present invention is to provide an articulation which performs all of the functions outlined above but yet is thin enough to permit an acceptably low floor height.

The articulation of the present invention comprises two elements, one fixed to each of the forward and rear vehicle sections, and an intermediate element, all of which present mean main planes which, with the vehicle on a horizontal surface, blend into a same horizontal plane. One of the fixed elements is articulated on the intermediate element around both a longitudinal horizontal axis and a transverse horizontal axis, while the other fixed element is articulated on the intermediate element around a vertical axis. In this manner, all three degrees of freedom are achieved. Furthermore, with such an arrangement, the thickness of the articulation is appreciably decreased, thus making it possible to reduce the level of platform over the articulation and, consequently, of the entire vehicle, while permitting the transmission of all of the desired forces.

In the preferred embodiment the intermediate part comprises two vertical, arcuate surfaces on opposite sides of a half ring member and both concentric with the effective vertical axis of articulation, one of the surfaces being convex and directed toward one of the fixed elements and the other being concave and directed toward the other fixed element. Two groups of vertically oriented rolling members, carried on one fixed element, establish rolling bearing contact with the vertical arcuate surfaces of the intermediate element around said vertical axis, and confine the intermediate element. Thus, the intermediate element makes possible a transmission of the pulling or pushing forces, depending upon which vehicle section is driven and whether the vehicle is accelerating or decelerating, while permitting relative rotation motion between the two sections of the vehicle. The embodiment proves especially simple and easy to execute, and offers a minimal thickness articulation since the thickness is effectively limited to the height of the rolling members plus the thickness of the members associated with the fixed element which overlie and underlie the rollers.

The articulation may also incorporate a device for dampening the rotation of the roller-bearing fixed element and the intermediate element about the vertical axis, for example, friction surfaces on the intermediate element and friction pads mounted on the fixed element. In the preferred embodiment a portion of the intermediate member comprises two horizontal rims forming, with the arcuately convex vertical wall, an arcuate channel into which a concave arcuate portion of the roller-bearing fixed element extends. With such an arrangement, the friction pads may be mounted on the roller-bearing fixed element on the portion which extends into the channel and hydraulically actuated to bear upon the overlying and underlying horizontal rims of the fixed element, which serve as the friction surfaces. Such an arrangement makes it possible to integrate a dampening device in the articulation, while maintaining a minimal vertical height.

The preferred embodiment also can accommodate transducers which monitor the magnitude and direction of the compressive forces at the articulation. This is especially advantageous in the case of articulated vehicles of the 'pushing' type, that is to say an articulated vehicle in which the wheels of the rear section are driven.

As described in detail in U.S. Pat. No. 4,320,811 which is incorporated herein by reference, with a force monitoring capability as outlined above, it is possible to determine the value of the transverse component of the compressive force at the articulation. The transverse component may then be compared to a threshold value. As disclosed in the application, the transverse stability of the vehicle when in a turn may be maintained by effecting the transfer of a part of the propulsion force from the rear section wheels to wheels of the forward section to maintain the transverse force component below the threshold.

Other characteristics and advantages of the invention will be seen from the detailed description of the preferred embodiment which follows and upon reference to the drawings, in which:

FIG. 1 is a schematic plan view of an articulated bus equipped with an articulation according to the present invention;

FIG. 2 is a plan view of an articulation according to the invention and the portions of an articulated vehicle into which it is incorporated;

FIG. 3 is an elevation view of the portion of an articulated vehicle shown in FIG. 2;

FIG. 7 is an exploded perspective view of a force measuring transducer of the articulation shown in the preceding Figures.

Figure 4:
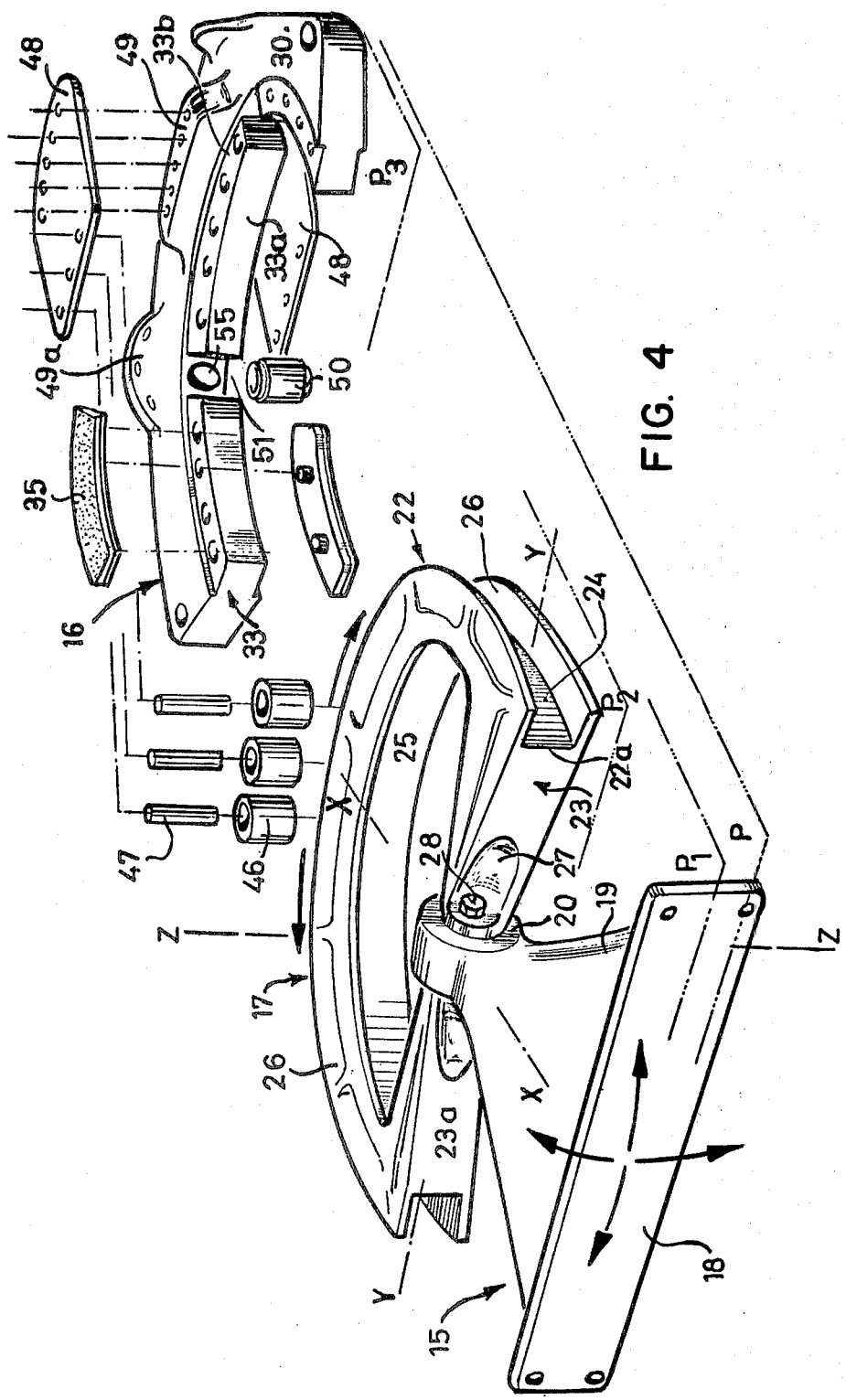
FIG. 4 is an exploded, perspective view of the articulation according to the invention and shown in FIGS. 2 and 3.

While the invention is susceptible of various modifications and alternative constructions, a certain illustrative embodiment has been shown in the drawings and will be described below in considerable detail. It should be understood, however, that there is no intention to limit the invention to the specific form described but, on the contrary, the intention is to cover all modifications, alternative constructions and equivalents falling within the spirit and scope of the appended claims.

An articulated bus represented in FIG. 1 comprises a front chassis and coach section 1 including steering wheels 2, rear wheels 3 which may be driven, a driving station 4 and two doors 5. The bus further comprises a rear chassis and coach section 6 having wheels 7, a motor assembly 8 and two doors 9. The front section 1 and the rear section 6 are connected by means of an articulation (not shown in FIG. 1) with three degrees of freedom, placed below a platform 10 interconnecting the floors of the two sections. A bellows-type structure 11 seals between the two coach portions while permitting the articulation of the sections relative to each other.

FIGS. 2 and 3 show in more detail the chassis, respectively 12 and 13, of the two sections 1 and 6 of the vehicle, the articulation according to the invention interconnecting those two chassis.

That articulation comprises three main parts, namely a first element 15 affixed to chassis 13 of the rear section 6, a second element 16 which is affixed to chassis 12 of the forward section 1, and an intermediate element 17 between those two sections. Each of the parts must be of high strength to transmit the forces between the vehicle sections and are preferably metal which has either been cast, forged or machined into the final configurations.

As shown in more detail in FIG. 4, the two fixed elements 15 and 16 and the intermediate element 17 are of relatively limited thickness relative to their other two dimensions, that is to say they spread, essentially, along the two directions of an approximately horizontal plane, those elements thus presenting main mean planes $P_1$, $P_2$ and $P_3$ which, with the vehicle on a horizontal surface, form a single horizontal plane P indicated in FIGS. 3 and 4.

The element 15 is articulated on the intermediate part 17, both around a longitudinal horizontal axis X—X, and around a transverse horizontal axis Y—Y, while the other fixed element 16 is articulated on the same intermediate element 17 around a vertical axis Z—Z. See FIGS. 2 to 4.

In the embodiment shown, the element 15 has a vertical base 18 of limited height which is bolted onto the chassis 13 of the rear section 6. A generally conically-shaped portion extends substantially horizontally in plane $P_1$ terminating with an end portion 20 having the shape of a cylindrical sleeve with its axis aligned with the horizontal transverse axis Y—Y. Referring to FIGS. 2 and 3, the sleeve 20 houses a resilient core 21. The core 21 may be fabricated of compressed rubber of the type used, e.g., for flexible motor mounts marketed under the tradename Silent Block.

The intermediate element 17 is generally in the shape of the letter D and comprises cylindrical half ring 22 to the ends of which are attached radially inwardly directed arms 23. The cylindrical half-ring extends over an angle of approximately 180°. The cylindrical half-ring 22 comprises a semi-circular web 22a having as its axis the vertical axis Z—Z of the articulation. The external surface 24 of the web 22a constitutes a first convex rolling surface directed toward the concave element 16, while its internal face 25 constitutes a second concave rolling surface directed toward the first element 15.

The half-ring 22 of the intermediate element 17 further comprises two outwardly directed semi-circular horizontal flanges 26 above and below the web 22a thereby forming, in conjunction with the web, a U-shaped semi-circular channel.

The arms 23 extend substantially diametrically from the external half-ring 22 toward axis Z—Z, terminating at opposite sides of the sleeve 20 of the element 15. The arms 23 have hollowed out areas 27 which permit the insertion and securement of a bolt 29, the head 28 of which may be seen in FIG. 4, which passes through the ends of arms 23, as well as through the central part of the resilient core 21. As shown in the figures, in its operative position the shaft of the bolt 29 is oriented along transverse horizontal axis Y—Y. This arrangement permits articulation of the element 15 on the intermediate element 17 around the transverse horizontal axis Y—Y, and limited articulation around the longitudinal horizontal axis X—X.

In the embodiment shown, the element 16 is generally in the shape of the letter C. The arc in the embodiment shown is slightly less than 180°. The element 16 includes a main body portion 30 which provides structural integrity and includes mounting holes for bolts at both ends for attaching the element 16 to supports 31 which project from chassis 12 into a recess 32 designed to receive the element, as shown in FIG. 2.

The element 16 also includes an inwardly-facing arcuate flange 33 of a slightly lesser thickness than that of the body 30 and comprising three separate sectors. The thickness of the sectors in turn is slightly less than the spacing between the inner surfaces of the rims 26 on the intermediate element 17. Those sectors each have a vertical arcuate surface 33a facing surface 24 of the intermediate element 17 and having a radius which is slightly greater than that of said surface 24. The sectors also have upper and lower horizontal faces 33b which, with the element 16 in operative position relative to element 17, face the overlying and underlying internal surfaces of the rims 26.

Friction pads 35, made of asbestos agglomerates for example, and mounted on supporting shoes 38, have substantially the same shape as upper and lower surfaces 33b of sectors 33 each sector between the shoulders 34 and the inwardly-facing surface 33a. Each sector of part 33 further comprises vertical bores 36, two per sector in the embodiment shown. Each of the bores 36 accept two pistons 37, one at the top and one at the bottom of each bore, which, as explained below, can be made to bear upon the supporting shoes 38, and consequently, the pads 35 to force the latter into frictional contact with the internal surfaces of the rims 26 which serve as friction surfaces.

In addition to the bores 36, there are also provided in each of the sectors 33 of element 16 two other bores 40 which receive positioning bosses 41 on the shoes 38. Springs 42, illustrated in FIG. 5, act in tension to retain the shoes 38 in contact with the surfaces 33b except during the activation of the pistons 37. The thickness of the shoes 38 and of the pads 35 is such that, in the absence of actuation of the pistons 37, the pads 35 do not come into contact with the friction surfaces of the rims 26 of the intermediate element 17.

Figure 6:
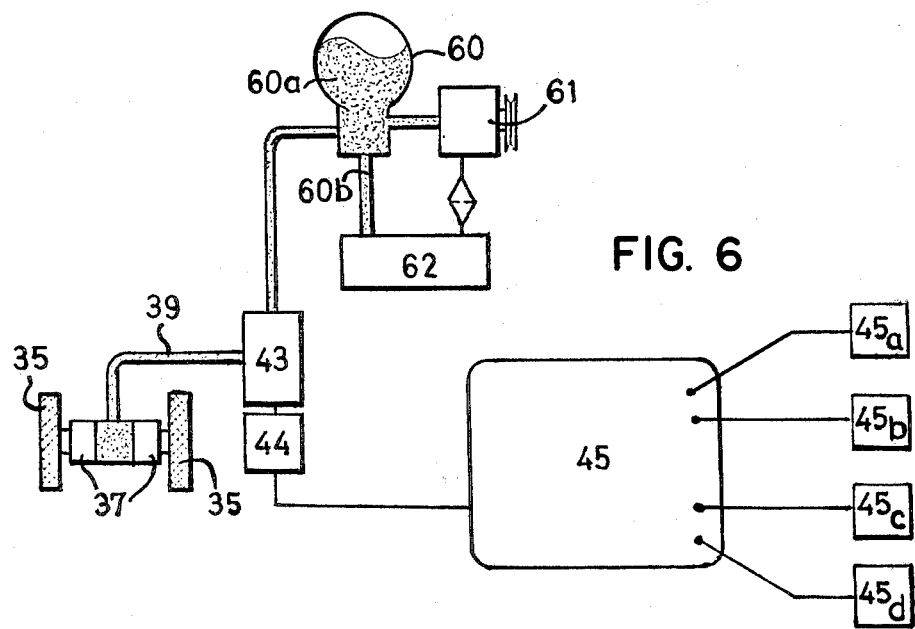
FIG. 6 is a schematic of the hydraulic and control circuit of the dampening system of the articulation shown in the preceding Figures.

As represented in FIG. 6, ducts 39 intersect with the bores 36 in the element 16 and are connected to the outlet of a valve 43, the inlet of which is connected to the chamber 60a of an accumulator 60. The accumulator contains a hydraulic fluid, e.g. oil, and a compressible fluid, e.g., air, which may be compressed through the action of a displacement pump 61 to provide a supply of pressurized hydraulic fluid for selectively actuating the pistons 37. The source of hydraulic fluid to the pump is reservoir 62, which also accepts overflow from the accumulator chamber 60a through duct 60b.

The movable member (not shown) of valve 43 is controlled by an actuating unit shown symbolically as block 44 which in turn is connected to a control unit shown as block 45. The control unit 45 is shown having a series of inputs 45a–45d representing transducers indicating, for example, the vehicle speed, the braking force (which can be monitored by sensing, for example, the pressure in the brake cylinders), the reaching of the maximum articulation angle (which can be sensed, for example, by limit switches placed on element 16 to be operated by projections on element 17), and finally, an emergency manual control to 'rigidify' the vehicle under ice, snow, mud or other adverse driving conditions. With such a control system any one of the various inputs 45a–45d can open valve 43, actuating the pistons 37 to force the pads 35 into contact with the friction surfaces of the rims 26 and thereby dampening or completely preventing relative movement between the elements 16 and 17.

Referring again to FIGS. 2 and 4, in the embodiment illustrated two groups of vertically oriented rollers are carried by the element 16 and cooperate with the two rolling surfaces 24 and 25 of the intermediate element 17.

The first group of rollers comprises three rollers 46, which are mounted on vertical shafts 47 fixed along an arcuate path concentric with axis Z—Z between two plates 48. The plates 48 are shown bolted to bosses 49 on the top and bottom surfaces of body 30 of element 16, in the central areas thereof. The plates 48 span the halfring 22 of the intermediate element 17 such that the rollers 46 contact the internal face 25 of the web 22a. With the arrangement shown, the rollers 46 can roll along surface 25 for almost 60° in both directions, which substantially exceeds the ±45° required articulation capability for buses noted above.

The second group of rollers comprises two cylindrical rollers 50 positioned between the sectors of the flange 33 of element 16, in recesses 51. Small plates 52 are provided for above and below the rollers 50 and affixed to the surfaces 33b of the sectors 33. As shown most clearly in FIG. 7, each roller 50 is hollow in part and encloses a compression spring 53 which acts against two disks 54 in depressions for centering the disks over the springs and aligning them with the rollers. These disks 54 are mounted at the ends of the rollers 50 to slidingly engage the plates 52 under the action of springs 53. The sliding surfaces of the disks 54 are relieved to accommodate foreign matter which might otherwise interfere with their movement.

Figure 5:
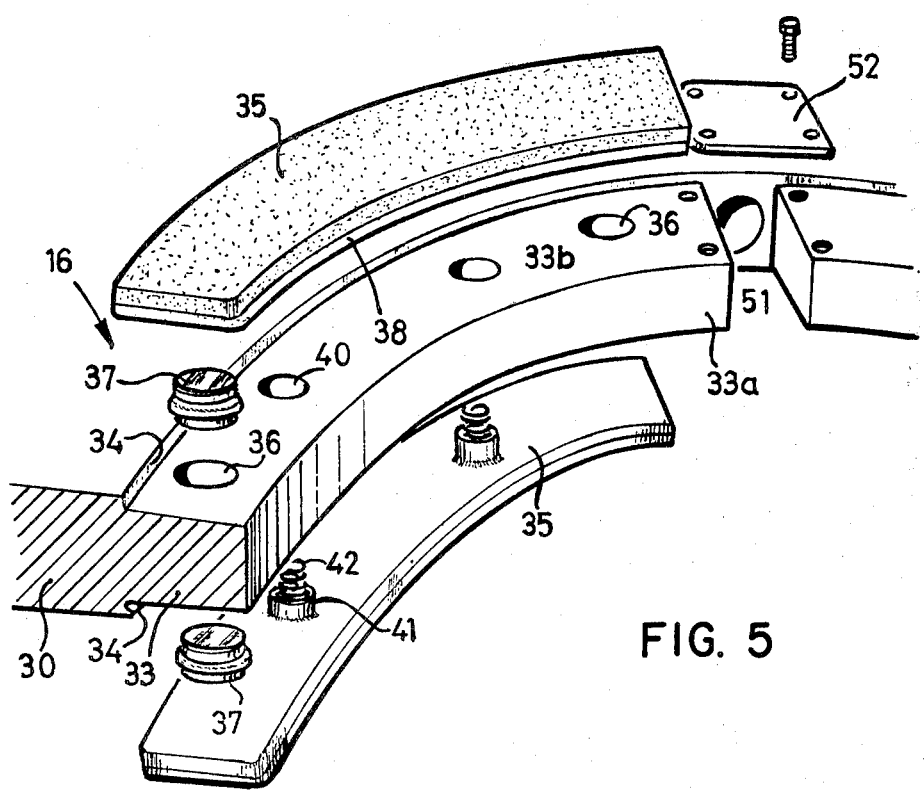
FIG. 5 is an exploded, perspective view of a portion of the articulation shown in the preceding Figures.

As shown in FIGS. 4 and 5, horizontally- and radially-directed bores 55 through the body 30 of the element 16 open respectively into each of the two lodgings 51 to accommodate the hemispherical detection head 56 of a force transducer 56a. The transducers 56a, which may be, for example, of the variable resistance type, the hydraulic type or piezo-electric quartz, are mounted to the body 30 of the element 16 through the flange-like projections 49a adapted to accommodate the transducer mounting arrangement. In the embodiment shown, the flanges add only slightly to the overall height of the articulation. As represented in FIG. 7, the hemispherical transducer head 56 is placed facing, and in point contact with, a force transmission element 57 which is guided inside the lodging 51 and which presents a flat surface facing head 56 and a semi-cylindrical surface facing roller 50. The semi-cylindrical faces of the push blocks slidingly engage the rollers 50 and are relieved, as was the case with the disks 54 above, to accommodate foreign matter without impairment of the sliding action. The rollers 50 and the force transmission elements 57 are sized such that normally rollers 50 and not the surfaces 33a of the flange 33, engage the external roller surface 24 of the intermediate element 17 and transmit any radially-directed, relative to axis Z-Z, compressive forces between the element 17 and the element 16. This arrangement preventing contact between the roller surface 24 and the surfaces 33a assures that the transducer heads 56a bear the entire compressive force between the elements 16 and 17.

It will be understood that during a turn the pushing force which is transmitted through the articulation will not be distributed symmetrically to the two rollers 50 nor, consequently, to the two transducers 56. It will be further appreciated that, using vector analysis and given the fixed relative orientations of the transducers and the magnitudes of the forces picked up by them, it is possible to determine the transverse component of the pushing force transmitted, as well as the articulation angle. When that component exceeds a pre-determined threshold value, an instability may appear tending to jackknife the vehicle. The co-pending application incorporated herein by reference discloses a drive and control system which may be very advantageously employed with the articulation of the present invention to maintain stability. As disclosed in that co-pending application, it may be advantageous to selectively apply a part of the total force of propulsion normally supplied solely to the wheels 7 of the rear section 6 in a push-type vehicle, directly to the rear wheels 3 of the forward section 1. According to one embodiment disclosed in that application, the wheels 3 may be hydraulically driven by means of a hydraulic transmission. The hydraulic lines 58 for such an arrangement are seen in FIG. 2 connected to hydraulic motors which drive the axle 59.

Having now described the details of an articulation according to the invention in detail, typical operation of a push-type vehicle under various conditions will be considered and explained.

In normal forward motion operation, the rear section 6 supplies a pushing force which is transmitted by the element 15 through the resilient core 21 of the intermediate element 17. The force is then transmitted to the element 16 through the surface 24 of the web 22a to the two rollers 50 through the lines of contact therebetween. The rollers 50 in turn bear against the heads 56 of the transducers 56a mounted to the element 16. A drive and control system of the type explained in detail in the co-pending application, not shown, may be designed in a manner such that, as long as the pushing force monitored by the transducers 56a does not reach a predetermined threshold, there is a normal transmission of the pushing force from the rear section 6 to the forward section 1, with only the wheels 7 of the rear section 6 being driven.

If, still traveling along a straight line, the motor 8 slows down, or if a braking force is applied to the wheels 7 of the rear section 6, there occurs a holding back effect which is also transmitted to the forward section by the articulation. Under these conditions the surface 25 of the intermediate part 17 bears against the rollers 46 carried by member 16 associated with the forward section, so that the latter is 'held back' by the rear section. The rollers 46 also act to pull the forward section when wheels 7 of the rear section 6 are driven in reverse, with the intermediate element 17 again applying a pulling force through its surface 25 to the rollers 46 of element 16.

When the vehicle moves in a turn, the pushing force is still transmitted in the same manner through the articulation, i.e. through the bearing of the surface 24 on the rollers 50. It will be appreciated, however, that in a turn the intermediate element 17 and the element 16 shift relative to one another, the rollers 46 and 50 respectively rolling over the rolling surfaces 24 and 25 of the intermediate element until the desired turning angle is obtained. As noted above, in the embodiment shown, the turning angle may reach 45° on each side of the longitudinal axis X—X of the vehicle.

If, moreover, because of irregularities in the road surface or other reasons rolling or pitching movements of one section relative to the other occur, the relative movements are permitted by the resilient core 21 inserted between the element 15 and the intermediate element 17. It will be appreciated that only a limited degree of such relative movements can be accommodated, but, on the other hand, such relative movements are not contemplated to be excessive during normal operating conditions.

We claim:

1. In an articulated vehicle of the type comprising a forward section with at least one axle and a rear section also with at least one axle, the forward and rear sections being interconnected by an articulation having three degrees of freedom, an improved articulation comprising:
    a first element affixed to one of the vehicle sections:
    a second element affixed to the other of the vehicle sections; and
    an intermediate element, each of the elements presenting mean main planes which, with the vehicle on a horizontal surface, blend into a single horizontal plane, the first element being articulated on the intermediate element both around a longitudinal horizontal axis and around a transverse horizontal axis, the intermediate element comprising first and second vertical arcuate surfaces, each of the arcuate surfaces being concentric with a vertical axis, the first surface being convex and directed toward the second element and the second surface being concave and directed toward the first element, the second element further comprising means for engaging the first and second vertical arcuate surfaces to confine the intermediate element to articulation relative to the second element around the vertical axis.

2. The improved articulation of claim 1, the means for engaging the first and second vertical arcuate surfaces comprising first and second groups of rolling members, the first group of rolling members being in rolling bearing contact with the first surface and the second group of rolling members being in rolling bearing contact with the second surface.

3. The improved articulation of claim 2 in which the first and second groups of rolling members are cylindrical members with vertical axes.

4. The improved articulation of either claim 2 or 3 in which the intermediate element comprises a substantially semi-circular half-ring member, opposite surfaces of the half ring member being the first and second vertical arcuate surfaces.

5. The improved articulation of claim 4, the substantially semi-circular half-ring member being oriented substantially horizontally and symmetrically relative to the horizontal longitudinal axis.

6. The improved articulation of claim 4, the intermediate element further comprising substantially radially inwardly directed arms extending from the ends of the half-ring member toward the transverse horizontal axis, the first element comprising a sleeve having an axis coincident with the transverse horizontal axis, the first element being articulated on the intermediate element by means of a shaft passing through the sleeve of the first element and the arms of the intermediate element.

7. The improved articulation of claim 5, the sleeve comprising a resilient core through which the shaft passes.

8. The improved articulation of claim 1 which further comprises dampening means to selectively dampen the articulation of the second element on the intermediate element around the vertical axis, the dampening means comprising at least one friction pad and at least one friction surface on the respective members, and means to selectively urge the friction pad against the friction surface.

9. The improved articulation of claim 8 in which the intermediate element comprises a substantially semi-circular half-ring member, the half-ring member comprising a web having a first vertical arcuate surface concentric with the vertical axis of articulation, the first vertical arcuate surface being convex and directed toward the second element, and at least one horizontal semi-circular flange extending outwardly from the web and having a friction surface, the second element comprising a second vertical arcuate surface concentric with the vertical axis of articulation, the second vertical arcuate surface being concave and directed toward the first vertical arcuate surface of the intermediate element, and a portion vertically spaced from the friction surface of the intermediate element, the friction pad being mounted to the portion of the second element spaced from the friction surface and selectively movable into contact with the friction surface.

10. The improved articulation of claim 9, in which the dampening means further comprise selectively operable hydraulic means for urging the friction pad against the friction surface by means of hydraulic pressure.

11. The improved articulation of claim 10, in which the dampening means further comprises control means for selectively operating the hydraulic means to apply hydraulic pressure to the friction pads, the control means being responsive to at least one input.

12. The improved articulation of claim 11 in which the control means is responsive to the speed of the vehicle.

13. The improved articulation of claim 11 in which the control means is responsive to the braking force applied to the vehicle.

14. The improved articulation of claim 11 in which the control means is responsive to a predetermined extent of articulation of the second element on the intermediate element around the vertical axis.

15. The improved articulation of claim 10 in which the hydraulic means comprise at least one piston mounted in the portion of the second element for vertical movement against the friction pad, the second element and the portion thereof having bores forming hydraulic fluid ducts.

16. The improved articulation of claim 9 in which the half ring member comprises two spaced horizontal semi-circular flanges extending outwardly from the web, the flanges forming a U-shaped semi-circular channel with the first vertical arcuate surface of the web, each of the flanges having a friction surface, the friction surfaces opposing each other.

17. The improved articulation of claim 1 which further comprises means for measuring two components of any compressive force between the intermediate element and the second element.

18. The improved articulation of claim 17 in which two rollers carried by the second element bear any compressive force exerted on the second element by the intermediate element, the rollers in turn bearing against force transducers mounted to the second element.

19. The improved articulation of claim 18 in which the two rollers carried by the second element are arranged symmetrically on each side of the longitudinal horizontal axis of articulation.

20. An articulation for an articulated vehicle in which a forward section with at least one axle and a rear section, also with at least one axle, are interconnected with three degrees of freedom, the articulation comprising:
 a first element adapted to be fixable to one of the vehicle sections;
 a second element adapted to be fixable to the other of the vehicle sections; and
 an intermediate element, each of the elements presenting mean main planes which, with the vehicle on a horizontal surface, blend into a single horizontal plane, the first element being articulated on the intermediate element both around a longitudinal horizontal axis and around a transverse horizontal axis, the intermediate element comprising first and second vertical arcuate surfaces, each of the arcuate surfaces being concentric with a vertical axis, the first surface being convex and directed toward the second element and the second element being concave and directed toward the first element, the second element further comprising means for engaging the first and second vertical arcuate surface to confine the intermediate element to articulation relative to the second element around the vertical axis.

21. The articulation of claim 20, the means for engaging the first and second vertical arcuate surfaces comprising first and second groups of rolling members, the first group of rolling members being in rolling bearing contact with the first surface and the second group of rolling members being in rolling bearing contact with the second surface.

* * * * *

UNITED STATES PATENT AND TRADEMARK OFFICE
CERTIFICATE OF CORRECTION

PATENT NO. : 4,371,186

DATED : February 1, 1983

INVENTOR(S) : Gerard Queveau et al.

It is certified that error appears in the above-identified patent and that said Letters Patent is hereby corrected as shown below:

Column 10, line 35, delete "element", second occurrence, and substitute -- surface --.

Signed and Sealed this

Seventeenth Day of May 1983

[SEAL]

Attest:

DONALD J. QUIGG

Attesting Officer

Acting Commissioner of Patents and Trademarks